Oct. 15, 1940.　　　J. P. BURKE　　　2,217,941

SPRING

Original Filed July 12, 1937

INVENTOR.
James P. Burke
BY
ATTORNEY.

Patented Oct. 15, 1940

2,217,941

UNITED STATES PATENT OFFICE 2,217,941

SPRING

James P. Burke, Knoxville, Tenn.

Original application July 12, 1937, Serial No. 153,206. Divided and this application March 30, 1939, Serial No. 265,010

5 Claims. (Cl. 267—63)

This application is a division of my co-pending application Serial No. 153,206, filed July 12, 1937, for Spring, patented May 9, 1939, No. 2,158,028. This invention relates to springs of the type suitable for a variety of uses such as for vehicle suspensions, power plant suspensions, flexible couplings and the like and has for its object to provide a spring composed of metal and an elastic material so combined as to give advantageous springing characteristics of each type of material and so arranged as to be capable of adaptation to any reasonable predetermined load deflection curve.

Another object is to provide a spring which is stable against tilting of its axis and flexible to a predetermined degree in the direction of its axis.

More particularly it is an object of the invention to provide a spring comprising a metallic spiral or volute with the coils thereof separated by elastic material preferably surface bonded thereto, the volume of elastic material varying to permit of a varying spring rate.

Another object is to provide a spring composed of inter-laid spirals or volutes of rubber and metal adapted to operate in the direction of the spring axis to store energy therein, the rubber being subjected largely to shear stresses, in combination with a stop means against which the metallic member progressively contacts whereby the maximum stresses to which any part of the spring can be subjected are predetermined and whereby the load deflection ratio of the spring may be made to increase with increasing loads in a manner determined by the shape and position of the stop means.

Other objects and advantages will hereinafter become more apparent as reference is had to the accompanying drawing wherein.

Figure 1:
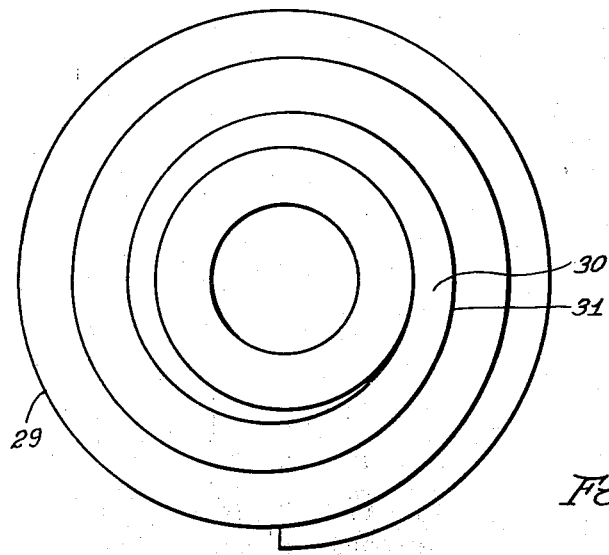
Fig. 1 is a top plan view of the spring.
Figure 2:
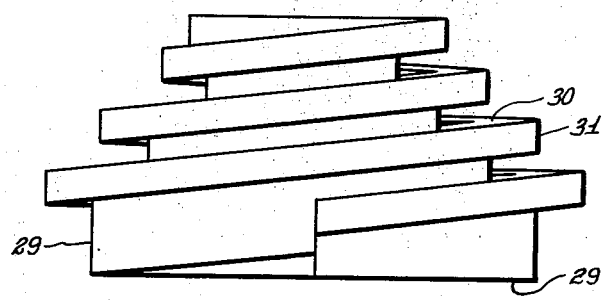
Fig. 2 is a side elevation.
Figure 3:
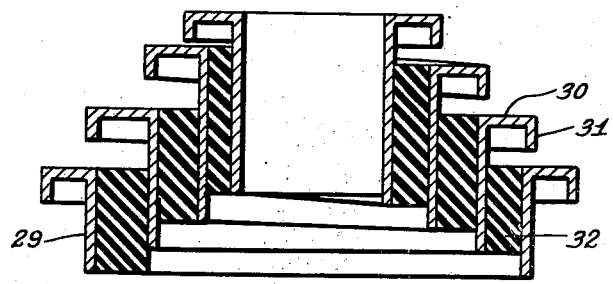
Fig. 3 is a vertical cross section.

According to this invention a spiralled volute 29 of metal is formed with out-turned flange portions 30 which are turned downwardly at the outer edge 31. Interposed between the coils of the volute 29 is a layer of elastic material 32 surface bonded on each side to the volute. The flange 30 is of sufficient width to span the elastic layer. When a load is imposed axially of the volute the elastic layer is subjected to shear. Due to the fact that the shear areas become progressively smaller toward the inside of the spiral and due to the fact that the stiffness of the spiral does not, in my design, increase to a compensating extent, the innermost turn will deflect faster than the remaining turns. The uppermost part of the step 31 will, therefore, contact the flange 30 therebelow first and the amount of contact will gradually increase with increasing loads. The load deflection ratio increases as the amount of spring employed decreases.

Various modifications will suggest themselves to those skilled in the art and I, therefore, desire to be extended protection within the scope of the appended claims.

What is claimed is:

1. The combination of a spring comprising a metallic spiralled volute having rubber interposed between and surface-bonded to the coils thereof, means acting in the direction of the spring axis for imposing a loading on said volute and said rubber, and stop means gradually and progressively precluding an amount of said spring from further deflection during the imposition of increasing loading thereon.

2. A spiralled metallic volute having elastic material interposed between the turns thereof and surface bonded thereto, the upper edges of each of said turns being bent outwardly by an amount greater than the thickness of said material.

3. A spiralled metal volute having the upper edges of each turn thereof extended outwardly substantially radially of the axis thereof, said radially extended portion having axially extended means for contact with the radially extended portion therebeneath.

4. A spiralled metallic volute having the upper edges of each turn thereof bent outwardly substantially radially of the axis thereof, and elastic means in shear between the turns of said volute.

5. A spiralled metal volute having the upper edges of each turn thereof extended outwardly substantially radially of the axis thereof, said radially extended portion having axially extended means for contact with the radially extended portion therebeneath, and elastic means in shear between the turns of said volute.

JAMES P. BURKE.